United States Patent [19]

Stockburger et al.

[11] Patent Number: 4,546,242
[45] Date of Patent: Oct. 8, 1985

[54] METHOD FOR PROTECTING AGAINST THE RE-TRANSFER OF UNIQUELY RECORDED INFORMATION ON A DATA CARRIER AND APPARATUS FOR RECORDING AND/OR READING RE-TRANSFER-PROTECTED INFORMATION

[76] Inventors: Hermann Stockburger, Kirnachweg 7, D-7742 St. Georgen; Siegfried Bauer, Kussenhofstr. 16, D-7743 Furtwangen, both of Fed. Rep. of Germany

[21] Appl. No.: 308,504

[22] Filed: Oct. 5, 1981

[30] Foreign Application Priority Data

Oct. 13, 1980 [DE] Fed. Rep. of Germany ....... 3038614

[51] Int. Cl.⁴ ............................................. G06K 19/06
[52] U.S. Cl. ..................................... 235/454; 235/493; 235/382; 340/825.34
[58] Field of Search ............... 235/454, 474, 458, 493, 235/488, 382, 386, 375; 340/825.34

[56] References Cited

U.S. PATENT DOCUMENTS

| | | | |
|---|---|---|---|
| 3,636,318 | 1/1972 | Lindstrom et al. | 235/488 |
| 4,013,894 | 3/1977 | Foote et al. | 250/569 |
| 4,034,211 | 7/1977 | Horst et al. | 235/454 |
| 4,041,279 | 8/1977 | Foote | 235/454 |
| 4,213,038 | 7/1980 | Silverman et al. | 235/382 |
| 4,213,041 | 7/1980 | Smith | 235/487 |
| 4,303,852 | 12/1981 | Silverman et al. | 235/382 |

FOREIGN PATENT DOCUMENTS

| | | |
|---|---|---|
| 817902 | 8/1959 | United Kingdom . |
| 1556241 | 11/1979 | United Kingdom . |
| 2021835 | 12/1979 | United Kingdom . |

*Primary Examiner*—Gene Z. Rubinson
*Assistant Examiner*—Robert Lev
*Attorney, Agent, or Firm*—Donald Brown

[57] ABSTRACT

A method of safeguarding against the re-transfer of uniquely recorded information on a data carrier (1) which includes the recording of the information data and in addition thereto simultaneously recording of additional information on the data carrier (1) which reflects co-ordination characteristics relative to the data carrier. In order to carry out the method an apparatus is provided for recording and/or reading a re-transfer protected information on a data carrier (1) with recording and/or reading device (4). The apparatus comprises a device (13) for detecting measurable properties (3) which are present at singular points of the data carrier (1) and for producing additional information characterizing such properties.

2 Claims, 6 Drawing Figures

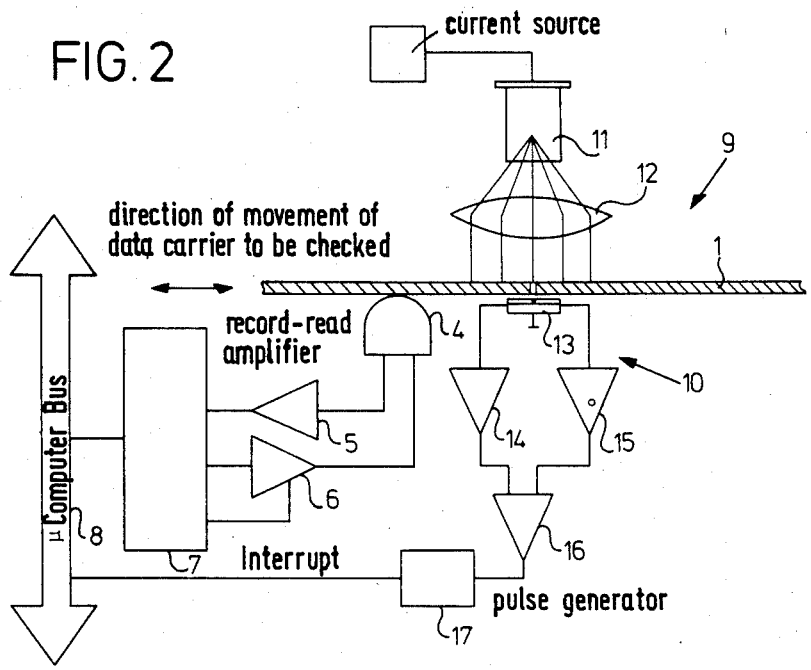
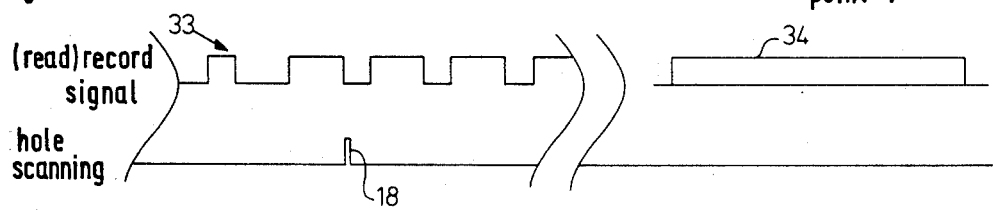
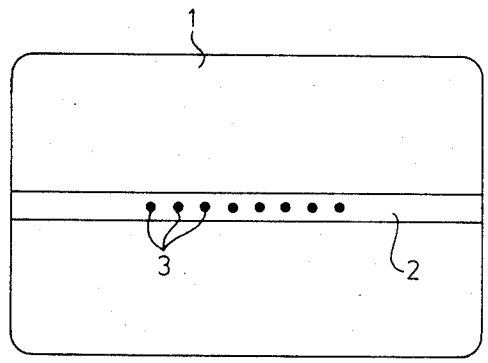

METHOD FOR PROTECTING AGAINST THE RE-TRANSFER OF UNIQUELY RECORDED INFORMATION ON A DATA CARRIER AND APPARATUS FOR RECORDING AND/OR READING RE-TRANSFER-PROTECTED INFORMATION

BACKGROUND OF THE INVENTION

This invention relates to a method of safeguarding against the re-transfer of uniquely recorded information on a data carrier. The invention further relates to apparatus for recording and/or reading re-transfer-protected information on a data carrier with a recording and/or a reading device.

OBJECTS OF THE INVENTION

It is a primary object of the invention is provide a method of the kind specified which precludes a re-transfer or re-recording on the same data carrier of uniquely recorded data after a potentially fraudulent copying of such data because such re-transferred data can be clearly detected as frauds. It is a further object of the invention to provide an apparatus for the practical application of this method.

SUMMARY OF THE INVENTION

In accordance with the invention a method is provided in which during the inscription, or recording of the unique information data additional information is simultaneously co-recorded which characterises a specific co-ordination of this information relative to the data carrier.

In accordance with the invention there is further provided an apparatus which comprises means for scanning measurable properties present at singular points of the data carrier in order to produce additional information which is characteristic for these properties.

BRIEF DESCRIPTION OF THE DRAWINGS

The invention is hereinafter more particularly described with reference to two examples shown in the accompanying drawings in which:

FIG. 1 shows a first example of a data carrier of the kind used for application of the method according to this invention, FIG. 2 is a schematic illustration of apparatus for applying the method according to the invention.

FIG. 3 shows a signal sequence which illustrates this method,

Figure 6:
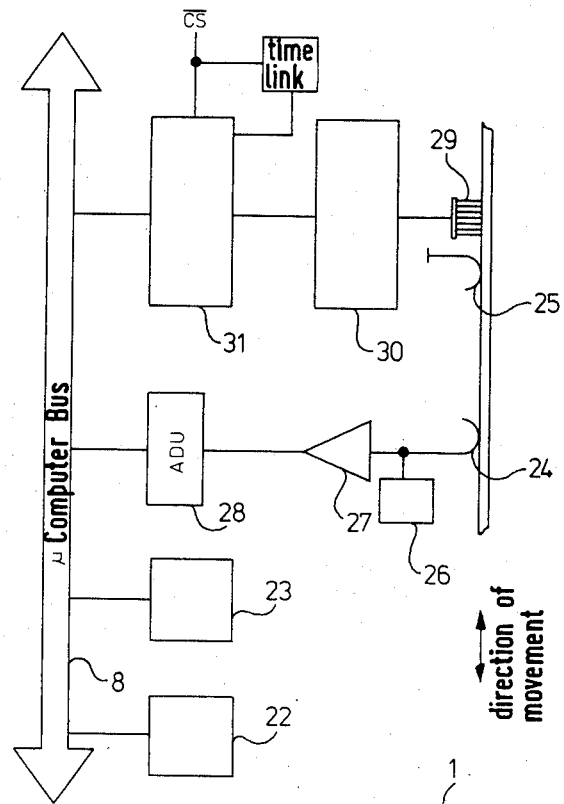
FIG. 6 is a schematic representation of apparatus for applying the modified method according to this invention.

The data carrier 1 is of the type commonly employed in credit-cards, cash-cards, cheque cards, identity cards and the like for use with automatic goods and service dispensing machines. The card comprises a magnetic strip 2 in which data relating to authenticity, identification and legitimacy of the user can be recorded. In principle any other data-storing means may be used instead of a magnetic strip. However, in view of its ready copying facility, preference will normally be given to the magnetic strip.

In this magnetic strip 2 a plurality of perforations, or holes 3 are arranged which are relatively spaced in the longitudinal direction of the strip. The relative spacing and the positioning of the holes 3 relative to the card are random. Their diameter is preferably within the general order of magnitude of 0.5 mm.

The card shown in FIG. 1 is designed for use in apparatus generally indicated at 9 and diagrammatically represented in FIG. 2. This apparatus is an evaluator or processor which is contained in automatic goods or service vending machines in conjunction with which the data carrier is designed to be used. The apparatus comprises a magnetic head 4 as well as a feed mechanism, not shown, which conducts the data carrier with its magnetic strip 2 over the magnetic head for the reading or recording of information data. The magnetic head 4 is connected to a computer, not shown, in conventional manner by suitable amplifiers 5, 6 a parallel-interface 7 and a bus line 8. So far the arrangement is identical with known apparatus.

In addition to this, however, there is provided a device, generally indicated at 10, for scanning, or detecting measurable properties present at singular points of the data carrier 1. The device 10 comprises a focussing, or collector lens 12 and a light source 11 arranged at the front focus point of said lens. The optical axis of the lens 12 is at right angles to the surface of the data carrier 1 and the lens is arranged in such a way that the area of the data carrier which is provided with the holes 3 is consecutively illuminated as the data carrier travels through apparatus 9. A differential diode 13 is arranged on the opposite side of the data carrier, i.e. remote from the light source, and connected via input amplifiers 14, 15 to the input terminals of a comparator 16. The output of comparator 16 is applied to the input terminal of a pulse generator 17 of which the output can be fed through the busline 8 to the computer.

The data carrier is activated, that is to say, information data are recorded or inscribed in its magnetic strip 2, in the conventional manner. The data block 33 which is to be recorded is worked down sequentially whereby a signal (FIG. 3) is fed to the magnetic head 4. The computer, or processor at all times holds readily available the information on which bit it is 'writing' or recording.

When one of the holes 3 is conveyed over the differential diode 13 the precise position of the hole centre is indicated by the fact that the differential diode feeds equal signals to the input amplifiers 14, 15 whereupon the comparator 16 feeds a corresponding signal to the pulse generator 17 and this generates an INTERRUPT signal 18 which is transmitted through bus 8 to the computer. The computer memorises at which particular bit of the recording the INTERRUPT signal occurred and thus the exact geometrical position of the hole centre relative to the data recorded in the magnetic trace. The same goes for all of the n remaining holes 3. At the end of the data block which is being recorded the device records an additional information 34 which identifies the bit points at which the n-hole centres were recorded. In this manner an exact arbitrary co-ordination is obtained between the holes and the geometrical positions of the data which are inscribed in the magnetic strip 2.

The reading-out of the inscribed data occurs in corresponding manner. An INTERRUPT signal 18 is generated for every hole centre and the computer memorises the mutual co-ordination or relative positional association of these INTERRUPT signals and the bit position which is being scanned, or read, at the same time. After completed scanning or 'reading' of the datablock 33 and the additional information 34, the INTERRUPT signal points which have actually occurred are compared with the originally memorised INTERRUPT signal co-ordination pattern. Only if deviations measured in this comparison do not exceed a predetermined tolerance is the scanned trace thus verified as being the original magnetic trace.

It is evident from the foregoing that the specific co-ordination of holes and bit positions of the data in the magnetic trace which is ascertained in the scanning or reading process will agree with the co-ordination of holes and data bits measured during the original recording and inscribed as additional information only if the recording is the original. With a copied information which had been subsequently re-transferred to the original data carrier, on the other hand, the co-ordination pattern could not be reproduced which means that such data-re-transfer would be detected immediately.

In the above described example of an embodiment of the invention the additional information is produced by means of holes in the magnetic trace. Such holes may also be arranged in other areas of the data carrier, subject only to the condition that they should be relatively spaced in a direction which is parallel to the direction of "reading" or "inscribing" and that they are within the operative range of device 9.

Figure 4:
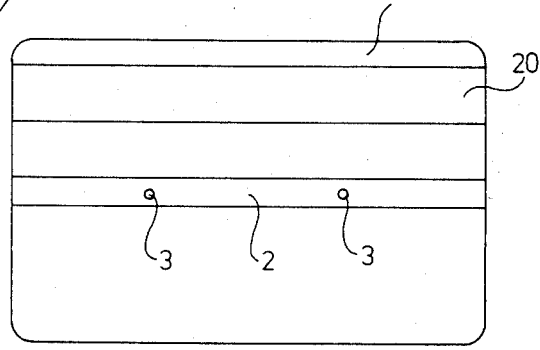
FIG. 4 shows a data carrier suitable for the application of a modified embodiment of the method according to this invention, comprises a metallic paper which is designed to give a visual indication of an, at least partial, invalidation.
Figure 5:
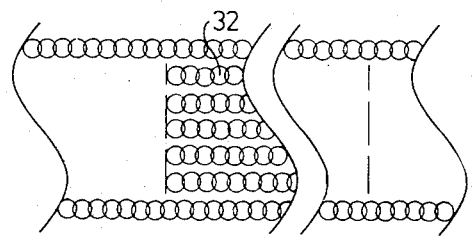
FIG. 5 is a schematic representation of a section of the data carrier as shown in FIG. 4 in the metallic paper region thereof.

FIGS. 4 to 6 illustrate a modified arrangement in which the data carrier is provided with a magnetic strip as well as with a metallic paper strip 20. The metallic surface of this strip is adapted to be irreversibly destroyed by an electrosensitive recording head. In all other respects the data carrier is the same as that shown in FIG. 1. The device for inscribing and reading out data information corresponds to the above described device shown in FIG. 2 as far as the reading head 4, the amplifiers 5, 6 the parallel interface 7, the bus line 8 and the associated data processing device are concerned. However, instead of, or in addition to the device 10 it comprises the device shown in FIG. 6. The device comprises first of all, the magnetic recording and reading device 22, which, as in FIG. 2 is connected via bus 8 to the associated data processing device. There is also provided a position pick-up 23. The apparatus comprises two measuring wipers 24, 25 (sliding brushes?) which are relatively spaced in the direction of feed of the data carrier and rest on top of the metallic paper strip 20. Wiper 25 is connected to a first potential. Wiper 24 is connected to a driving current source 26 and to the input of an amplifier 27. The output signal of amplifier 27 is converted in an analog-digital converter 28 and applied through the bus 8 to the data processor. Also connected to the data processor through the bus 8, via electrode driver 30 and a parallel interface 31 is an electrosensitive recording head 29. The recording head 29 is so arranged that the metallic paper is conveyed longitudinally beneath this head when the data carrier is fed through the apparatus. By means of the current source 26 and the wipers 24, 25 a current is driven through the ohmic resistance represented by the metallic paper strip, and this resistance is measured. If the total value represented by the data carrier is reduced by consumption e.g. by the withdrawal of a portion of the total credit amount represented by the card, one part, or area 32 of the trace is irreversibly destroyed by burning caused by the head 29 when this is activated by the computer through parallel interface 31 and electrode driver 30. In this way a visual indication is provided of the state of depreciation or reduced credit value whilst on the other hand the destruction of the area 32 alters the ohmic resistance value measured across the wipers 24, 25. With the aid of the position pick-up 23 the metallic paper strip is sub-divided into n zones or parts so that the boundary of the depreciated part of the metallic paper strip can be associated with a uniquely defined position.

In practical operation the data is recorded, or inscribed, in the magnetic strip 2 in the same way as in the first described example. At the end of the recorded data an additional information is recorded which reflects the position of the destruction mark relative to the magnetic trace and the ohmic resistance value which reflects the degree of destruction. When the data carrier is scanned the information data as well as the simultaneously recorded additional information data are 'read' out and the co-ordination or relative position of position mark and magnetic trace as well as the ohmic resistance are ascertained. Actual resistance is measured at the end of the reading process whereupon the co-ordination of position mark and magnetic trace as well as the ohmic resistance are compared with the corresponding data recorded in the trace. Since the depreciation of the metallic strip is irreversible a duplication of the original magnetic trace reflecting the initial full credit amount and its re-transfer to the card after consumption of the credit are immediately and clearly detected.

For depreciation or partial invalidation consequent upon a reduction in the total credit value the above described apparatus operates as follows:

First a quotient is formed of the momentary and the original values of measured ohmic resistance. The length of the strip which is to be cancelled is then sub-divided in accordance with this ratio. Position and length of the cancelled (defaced) area relative to the magnetic trace were already measured during the scanning or reading of the data carrier. This allows the start and finish of defacement on the magnetic strip to be determined. After defacement has been applied the card is returned to the final position and a new reading taken of actual ohmic resistance. This value is then once again recorded in the total information.

In principle it is of course also possible to combine the two above described methods by, as shown also in FIG. 4, providing suitable holes for positional identification.

In the above described examples of execution, the geometrical position of holes or the geometrical boundaries of a partially destroyed area and its altered ohmic resistance were used to produce the additional information. In principle, however, it is equally possible to use other properties of the data carrier which can be co-ordinated with the geometrical position of bit informations in the magnetic strip for generating such additional information, provided only that such properties are capable of generating or yielding discrete recordable data.

It should be understood that the above description is in no way limitative and that many modifications may be brought to the embodiments disclosed without departing from the true spirit of the invention.

We claim:

1. A document with top and bottom sides having a magnetic strip with at least one data storage track, said document having a plurality of holes extending therethrough so that light can pass through the holes from one side of the document to the other side of the document, the holes being in a row substantially parallel to the data storage track, a first set of data bits and a second set of data bits stored in said data storage track, said second set of data bits representing a relationship between bits of said first set of data bits and the geometric position of the holes.

2. A system for authenticating a document with top and bottom sides having a magnetic strip with at least one data storage track, said document having a plurality of holes extending therethrough so that light can pass through the holes from one side of the document to the other side of the document, the holes being in a row substantially parallel to the data storage track, a first set of data bits and a second set of data bits stored in said data storage track, said second set of data bits representing a prior determined relationship between bits of said first set of data and the geometric position of the holes, said system comprising means for moving the document through the system, means for reading out the first set of data bits as the document is moving, means for directing a beam of light against said document as it is moving and detecting each time the beam of light passes through said holes one at a time, means for determining the geometric position of said holes as represented by the detected light beam passing therethrough with respect to said first data bits and means for comparing said determination made while moving the card with the second set of data bits representing said prior determined relationship to determine if said document is authentic.

* * * * *